May 26, 1931.   R. G. ALLEN   1,806,731
DISTRIBUTING HEAD FOR GLASSWARE FORMING MACHINES
Filed July 30, 1928   4 Sheets-Sheet 1
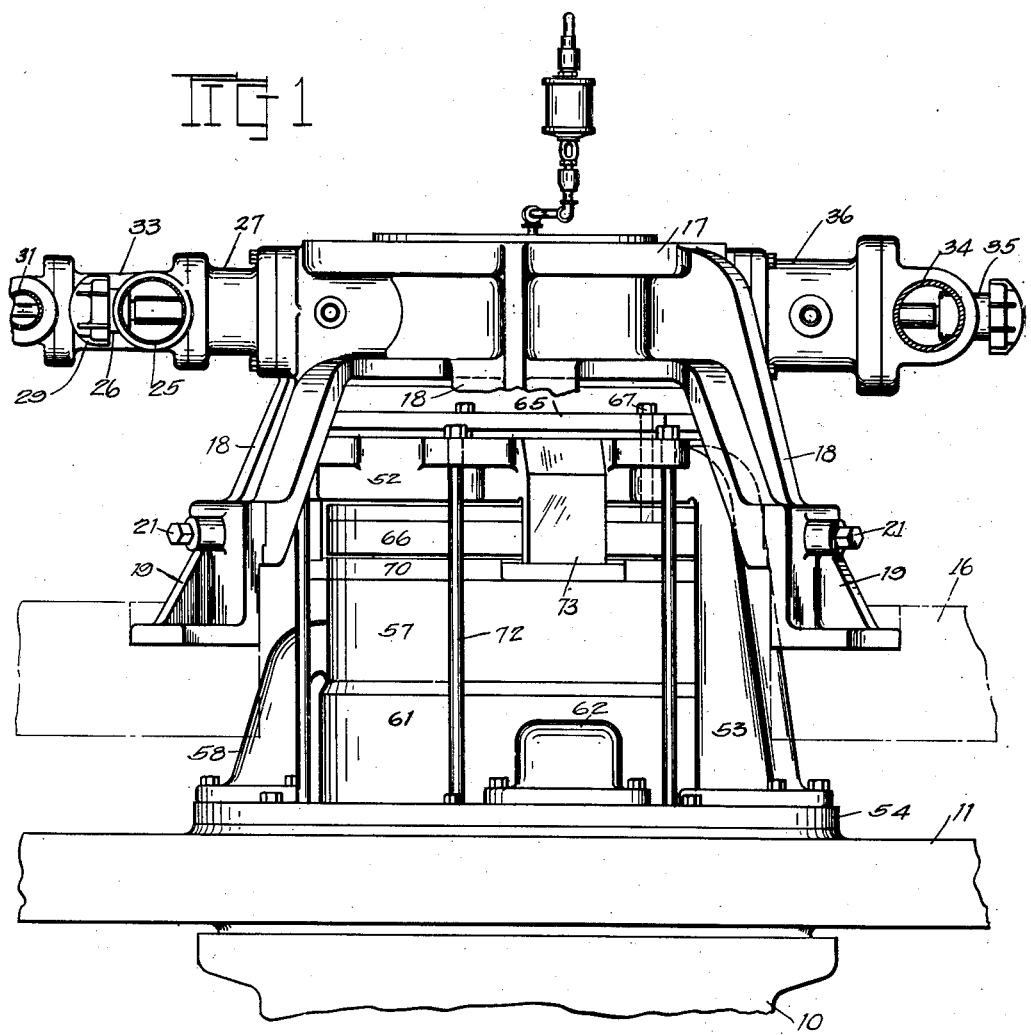

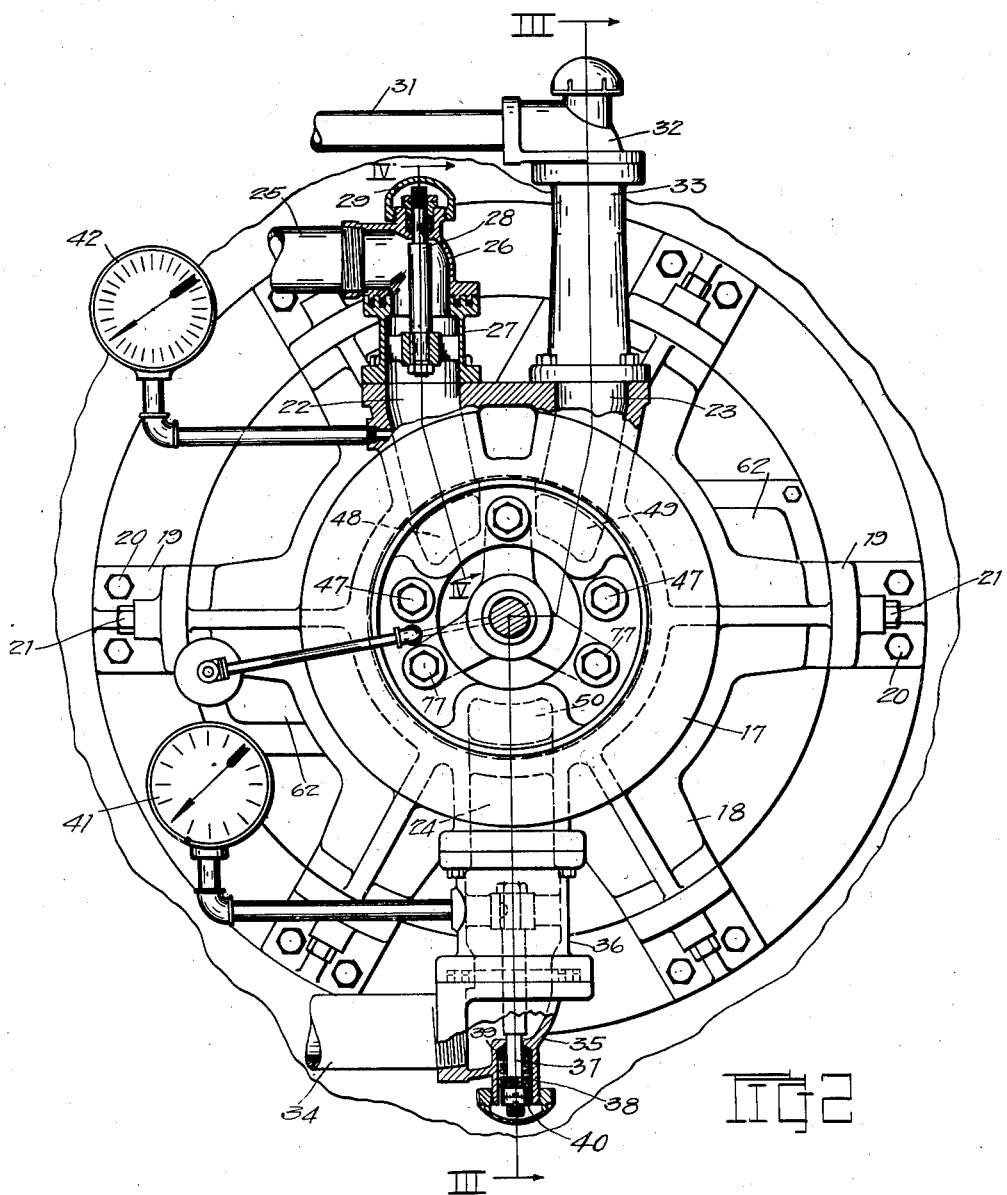

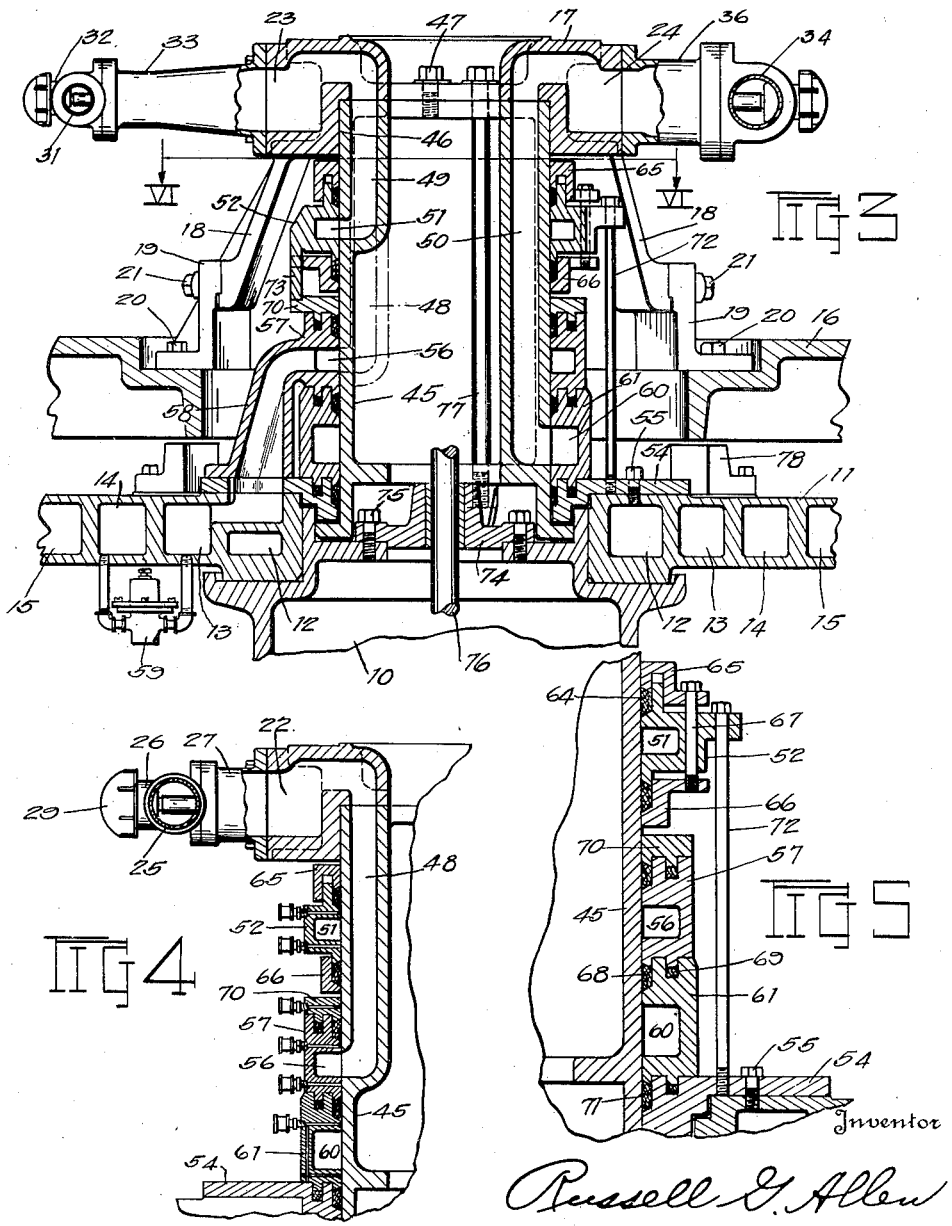

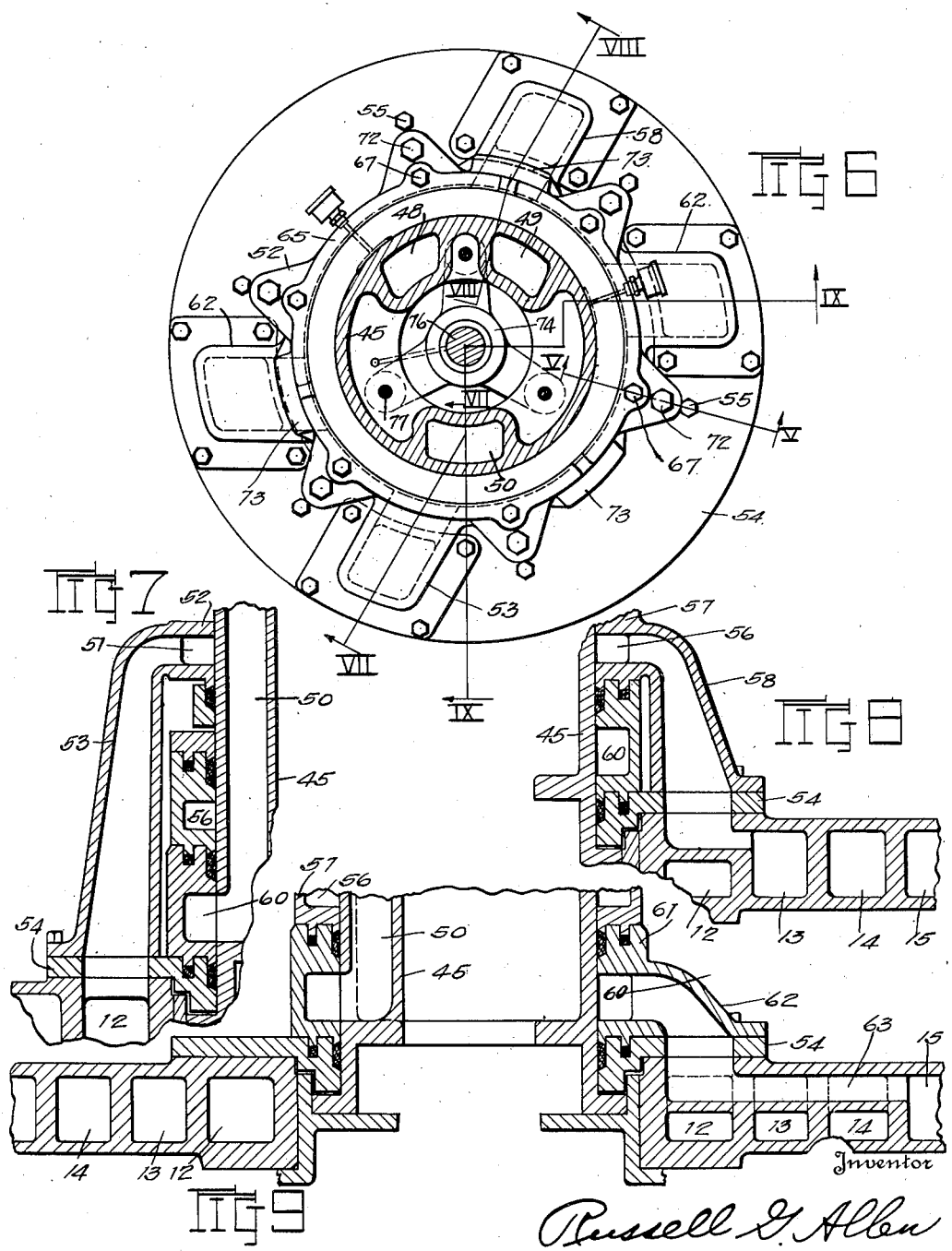

Patented May 26, 1931

1,806,731

UNITED STATES PATENT OFFICE

RUSSELL G. ALLEN, OF TOLEDO, OHIO, ASSIGNOR TO OWENS-ILLINOIS GLASS COMPANY, OF TOLEDO, OHIO, A CORPORATION OF OHIO

DISTRIBUTING HEAD FOR GLASSWARE FORMING MACHINES

Application filed July 30, 1928. Serial No. 296,146.

My invention relates to a distributing head adapted for use with and forming part of a machine for forming hollow glassware, altho the invention is not limited to such use. It is designed for directing and distributing fluids such as air under pressure and water in their passage to the different heads or units of the machine, and also for directing and conducting rarefied air as it is exhausted from the molds and other parts of the machine. The water may be used, for example, to cool the molds; and the air under different pressures for compacting the glass in the molds, blowing it to hollow form, operating air motors on the machine, etc. The rarefied air or vacuum is particularly adapted for exhausting the molds in the process of gathering glass thereinto by suction.

The distributing head, as herein disclosed, comprises a stationary central drum or cylinder surrounded by a plurality of distributing rings, each comprising an annular passageway surrounding the drum and thru which the fluids are transmitted from the drum and thence conducted to chambers, from which the fluids are supplied to the various parts of the machine as required.

An object of the invention is to provide improved means for preventing leakage of the fluids in their passage from the drums to the distributing rings. The invention further provides a novel construction by which the distributing head may readily be removed as a unit from the machine, and various other features of utility in the assembling and disassembling of parts of the machine, all as will more fully appear hereinafter.

Other objects of the invention and the precise nature thereof will appear more fully hereinafter.

Referring to the drawings:

Fig. 1 is an elevation view of the distributing head.

Fig. 2 is a plan view thereof, portions being shown in section.

Fig. 3 is a sectional elevation taken at the planes of the line III—III on Fig. 2.

Fig. 4 is a section at the line IV—IV on Fig. 2.

Fig. 5 is a section at the line V—V on Fig. 6.

Fig. 6 is a section at the line VI—VI on Fig. 3.

Figs. 7, 8 and 9 are sections taken, respectively, at the lines VII—VII, VIII—VIII and IX—IX on Fig. 6.

The distributing head, as herein shown, is mounted on the upper end of a stationary cylindrical column 10 which forms the center column of a glass blowing machine. Said machine may comprise a rotating mold carriage on which are supported the several heads or units to which the fluids are supplied from the distributing head. The mold carriage includes an upper plate or casting 11, rotatably supported on the column 10 and formed with annular chambers or compartments 12, 13, 14 and 15 concentrically arranged. The chamber 12 contains water; the chamber 13 air under high pressure; the chamber 14 air under low pressure; and the chamber 15 rarefied air or vacuum.

Above the casting 11 is a stationary or non-rotating cam plate 16 which is supported by the non-rotating parts of the distributing head. Said head comprises an upper member or casting 17 formed with downwardly and outwardly inclined brackets 18 which are connected by means of L-shaped brackets 19 to the cam plate 16. The brackets 19 are secured by bolts 20 to the cam plate and by bolts 21 to the legs 18.

The casting 17 is provided (see Figs. 2 and 3) with radially disposed channels 22, 23 and 24. Air under pressure is supplied thru a pipe 25 and the channel 22 to the distributing head. An elbow joint 26 provides a flexible connection between the air pipe 25 and a pipe section 27 bolted to the casting 17, permitting a relative rotation of the elbow 26 and section 27 as may be required in the up and down adjustment of the distributing head. The elbow 26 is held to the pipe section 27 by means of a bolt 28. A removable cap 29 permits access to the bolt for the purposes of assembly and adjustment.

A water supply pipe 31 is connected thru an elbow 32 and pipe section 33 to the casting 17 for supplying water thru the channel 23.

The elbow 32 is rotatively connected to the pipe 33, the construction being similar to that of the air pipe connection above described.

A vacuum pipe 34 leading from any suitable air exhausting means, communicates thru an elbow 35 and pipe section 36 with the channel 24 in the casting 17. A connecting bolt 37 similar in function and operation to the bolt 28 is provided in connection with the elbow 35. There is preferably additionally provided a spring 38 surrounding the bolt 37 and held under compression. This serves to maintain a continuous pressure of the elbow 35 against the pipe section 36 and also maintains a pressure on the packing 39 surrounding the bolt, thus effectively preventing leakage. Adjusting nuts 40 permit the tension of the spring to be adjusted. A vacuum gauge 41 and an air pressure gauge 42 are connected, respectively, to the vacuum and air lines. These gauges may be horizontally disposed, as indicated, or swung upward and retained in a vertical position or at any other convenient angle for reading.

A stationary central drum 45 has its upper end fitted into a recess 46 formed in the casting 17. The drum is secured to the casting by means of short bolts 47 (Figs. 2 and 3), said bolts extending thru flange portions of the casting 17 and drum 45. The drum is formed with three vertically disposed channels 48, 49 and 50 which connect at their upper ends, respectively, with the air channel 22, water channel 23 and vacuum channel 24. The water channel 49 (Fig. 3) extends downward in the drum 45 a comparatively short distance and at its lower end opens thru the wall of the drum into an annular passageway 51 formed in a water distributing ring 52 which surrounds the drum and which is adapted to rotate around the drum, as more fully set forth hereinafter. The distributing ring 52 (see Fig. 7) is formed with a hollow bracket or arm 53 extending downward therefrom and secured to an annular bearing plate 54. The plate 54 is secured by bolts 55 (Fig. 3) to the plate 11. As shown in Fig. 7, the channel 51 in the distributing ring 52 communicates thru the hollow arm 53 and an opening in the plate 54 with the water compartment 12. It will thus be seen that the water pipe 31 (Fig. 2) is in continuous communication thru the passageways just described, with the water compartment 12 in the member 11 which rotates with the mold carriage. The means for distributing water from the chamber 12 to the molds is not shown, as it forms no part of the present invention.

Air is conducted in like manner from the pipe 25 (Fig. 2) to the high pressure air chamber 13. For this purpose, the air channel 48 (see Fig. 4) opens at its lower end thru the wall of the drum 45 into the air channel 56 formed in the air distributing ring 57. Said ring is formed with a hollow arm 58 (Figs. 6 and 8) secured to the plate 54, the latter having an opening in register with the hollow arm, providing communication with the high pressure air chamber 13. As shown in Fig. 3, the high pressure chamber 13 has communication with the low pressure chamber 14 thru a pressure reducing valve 59.

The vacuum line extends thru the channel 50 in the drum 45 to the annular passageway 60 in the vacuum distributing ring 61. Said ring is formed with hollow arms 62 (Figs. 6 and 9). The vacuum line is continued thru said arms and passageway 63 to the vacuum chamber 15.

The distributing rings 52, 57 and 61 (Fig. 5) which surround the stationary drum 45 and are rotated either continuously or intermittently, depending on the type of machine with which the distributing head is used, are provided with suitable packings for preventing leakage. The water distributing ring 52 (see Fig. 5) is provided with packing rings 64 held in position by an upper packing gland 65 and a lower gland 66. Bolts 67 secure the glands in position and can be adjusted to apply the proper amount of pressure to the packing rings.

The air distributing ring 57 and vacuum ring 61 are formed with abutting surfaces and are shaped to provide spaces for packing rings 68 and 69 (Fig. 5). A packing gland 70 is provided above the ring 57, suitable packing material being interposed between said gland and ring. Packing material 71 is also placed between the vacuum ring 61 and the plate 54, said plate and ring having abutting faces. The several distributing rings are all clamped together and held in position by bolts 72 which at their upper ends extend thru lugs formed on the ring 52, and at their lower ends are threaded into the plate 54. The ring 52, as shown, is spaced a short distance above the packing gland or ring 70, but is provided at intervals around its periphery with feet 73 (see Figs. 1 and 3) which rest on the ring 70.

It will be seen that with this construction, the distributing rings are all held together as a unit and the pressure between the several rings is equalized, and at the same time, the packing glands for the water distributing ring 52 may be adjusted independently of the other packing glands to insure a water tight connection being maintained. The packing material constituting each packing ring comprises a predetermined number of layers or rings such as required to fill the packing spaces and supply the desired pressure when the parts are clamped together by the bolts 72.

A bearing plate 74 (Fig. 3) is secured by bolts 75 to the center column 10 and provides a bearing for a shaft 76 of an electric motor (not shown) which may be mounted on the plate 17, said shaft being connected thru suitable gearing for driving the machine. Bolts 77 extend vertically downward thru the drum 45 and are connected at their lower ends to the bearing plate 74, thereby securing the head 17 to the column 10.

The entire distributing head may readily be removed from the machine by removing the bolts 20, 55 and 77, allowing said head to be lifted from the machine. When the bolts 20 are loosened or removed, the cam plate 16 which is supported from said head is permitted to drop downward a short distance onto supporting blocks 78 which support the cam plate until the distributing head and the bolts 20 are replaced. The cam plate 16 may be removed from the machine without removing the distributing head, by removing the bolts 21 and the bolts which connect the pipe sections 27, 33 and 36 to the casting 17, so that the pipe sections may be swung up out of the way. By removing the bolts 21, the upper member 17 of the distributing head may be separately removed.

Modifications may be resorted to within the spirit and scope of my invention.

What I claim is:

1. A distributing head comprising, in combination, a stationary drum, a distributing ring surrounding the drum and having an annular passageway, said drum having a port opening into said passageway, means for rotating said ring, packing glands above and below said ring, and means for clamping said packing glands to the ring for rotation therewith.

2. In a distributing head, the combination of a vertically disposed central stationary drum, a plurality of distributing rings surrounding said drum and each formed with an annular passageway for the circulation of a fluid, means providing passageways thru said drum communicating, respectively, with said annular passageways, clamping devices clamping said rings together, and means for rotating said clamping devices and rings as a unit about the axis of said stationary drum.

3. In a distributing head, the combination of a vertically disposed central stationary drum, a plurality of distributing rings surrounding said drum and each formed with an annular passageway for the circulation of a fluid, means providing passageways thru said drums communicating, respectively, with said annular passageways, clamping devices clamping said rings together, means for rotating said clamping devices and rings as a unit about the axis of said stationary drum, the opposing faces of said rings being shaped to form annular spaces for packing material, and packing material within said annular spaces, said packing material being clamped in said annular spaces by said clamping devices and rotating with said rings.

4. In a distributing head, the combination of a vertically disposed central stationary drum, a plurality of distributing rings surrounding said drum and each formed with an annular passageway for the circulation of a fluid, means providing passageways thru said drum communicating, respectively, with said annular passageways, clamping devices clamping said rings together, and means for rotating said clamping devices and rings as a unit about the axis of said stationary drum, said rings having abutting faces shaped to provide spaces for packing material.

5. In a glassware forming machine, the combination of a stationary central column, a distributing head mounted on said column, comprising a central drum rigidly secured to the column, a rotary frame member surrounding the drum and supported on said column, distributing rings surrounding said drum, a plate supported on said frame member, clamping bolts connecting said rings together and to said plate, and bolts securing said plate to said frame member and removable to permit said plate and distributing rings to be removed as a unit from the machine.

Signed at Toledo, Ohio, this 27th day of July, 1928.

RUSSELL G. ALLEN.